United States Patent Office 2,697,083
Patented Dec. 14, 1954

2,697,083

MOLDING COMPOUNDS COMPRISING ALKALINE EARTH METAL OXIDE AND BORAX AS STICKING AND STAINING PREVENTIVES

Clark C. Heritage, Tacoma, Wash., assignor to Weyerhaeuser Timber Company, Tacoma, Wash., a corporation of Washington No Drawing. Application October 24, 1952,
Serial No. 316,809

5 Claims. (Cl. 260—17.2)

This invention relates to the manufacture of molding compositions comprising selected components of the barks of trees and thermosetting resins, and has particular reference to the incorporation of small amounts of additives chosen for their ability to impart resistance to staining of or adherence to the mold during the molding process.

Staining refers to a condition which first appears as a slight discoloration of the mold, due to etching of the mold probably resulting from high hydrogen ion activity of the compound on the mold. Sticking refers to the condition which first manifests itself as adhesion of parts or of small points of the surface of the molded piece to the mold. The condition results in the pulling of pieces from the molded article or, in severe cases, destruction of the molded piece upon opening of the mold.

The invention has for its principal object the provision of alkaline earth oxides, preferably magnesium oxide, as a deterent to the staining of molds by thermosetting molding compounds which comprise fillers derived from the bark of trees.

It is a further object of the invention to provide for the incorporation of alkaline earth oxides, preferably magnesium oxide, together with borax as ingredients of thermosetting molding compounds for reducing or eliminating staining of and adherence of the compound to the mold during the molding process.

It is a further object of the invention to provide for the incorporation of small quantities of borax as an ingredient of thermosetting molding compounds as a means of reducing or eliminating adherence of the compound to the mold.

Various and other ancillary objects of the invention will become apparent from the following description and explanation.

Molding compounds embodying the invention consist essentially of a thermosetting resin, a filler derived from the barks of coniferous trees, a catalyst for the resin, and materials which reduce or eliminate staining of and adherence of the compound to the mold during the molding process.

Resins which are commonly used include the phenol-aldehydes including phenol-formaldehydes, phenol-furfuraldehydes, the cresol-formaldehydes, and the resorcinol-formaldehydes, as well as urea-formaldehyde resins and others. These resins may be either one-step or two-step thermosetting resins, and these may be either liquid or solid. However, the preferred resin for use with bark component fillers in the present invention is a one-step, alkali-stabilized, phenol-formaldehyde liquid resin in which the molar ratio of aldehyde to phenol is greater than 1.1:1, and preferably is greater than 1.4:1. Phenol resins of the casting type are particularly useful for this purpose.

The bark of trees represents a large, economical and attractive source of easily comminuted material for use as fillers in the manufacture of molding compounds. Bark is composed essentially of three components, namely, cork, sclerenchyma tissue either as stone cells or bast fibers, and parenchyma tissue which, in finely comminuted state, often is referred to as bark powder. It has been discovered that these separate tissue components of bark have different physical and chemical characteristics which distinguish each of them from the others, and that each of said components contributes properties to a molding compound differing in accordance with the physical and chemical constituents of the component.

Cork is that component of bark which, when highly comminuted and separated from the other components, will float on a benzene-carbon tetrachloride mixture having a density of 1.24 g./cc. Sclerenchyma is that component of bark which, when highly comminuted to separate it completely from other components of the bark, will, in the case of Douglas fir bast fiber, sink in a benzene-carbon tetrachloride mixture having a density of 1.45 g./cc. but will float on such a mixture having a density of 1.47 g./cc. The parenchyma tissue may be considered to be the remaining portion of the bark after removal of the cork and sclerenchyma.

Any one or a carefully blended combination of bark components may be selected as an ingredient of molding compounds having predetermined and reproducible properties. Whole bark, however, is completely unsuited for use as a filler because of the variation of properties which the several components of the bark impart to the compound. For example, because of their thermoplasticity, bark fractions which are rich in cork, or which are rich in parenchyma tissue or powder, are unsuited for use as molding compound fillers.

Of the three components of bark, namely, cork, sclerenchyma and powder, the sclerenchyma is the most desirable for use as a filler in a molding compound, for the reason that it imparts excellent strength and impact resistance to the molded piece, and also because it has a low specific surface and is difficult to impregnate with resin. The resin remains on the surface of the filler particles and functions as a bonding agent and to promote flow, rather than being absorbed by the filler.

A significant advantage of the instant invention lies in the fact that the use of sclerenchyma filler permits the use of relatively low percentages of resin solids. It is conventional in the art relating to molding compound manufacture to use a minimum of 40% resin solids, and frequently resin usages are of the order of 50% to 70% of the composition. The invention teaches that with the use of fillers derived from bark, particularly those rich in sclerenchyma tissue, acceptable molding compounds are produced with as little as 15% to 40% resin solids, based on the solids content of the composition, and that general purpose competitive molding compounds are made in which the resin solids content is between 25% and 35%.

Despite the economic advantages of low resin usage permitted by the incorporation of sclerenchyma tissue in the molding compound formulation, such practice results in the magnification of difficulties inherent in molding compounds having higher resin contents. Not the least of these difficulties is the fact that low resin molding compounds comprising reactive bark components as fillers have marked tendencies to stain the molds and to adhere to the molds during the molding proces. These tendencies are markedly decreased as resin content is increased, but increase in resin content represents an uneconomical, and, as shown in this disclosure, an unjustifiable solution to the problem.

The instant invention embodies the discovery that small percentages of alkaline earth oxides, preferably magnesium oxide, and of borax, as ingredients of thermosetting molding compounds, are effective to reduce, and often eliminate, staining of and adherence of the molding compound to the mold.

Causes of stain may be the volatile or soluble acids in the bark components, or the thermal degradation products of these components. Bark is acidic in nature with a water extract having a pH value of about 3.5. Each bark component does not cause the same degree of stain. The influence of bark components on the staining properties of a molding compound may be seen in the data in Table I. Various molding compounds consisting of resin and commercially separated bark components were prepared and tested for their tendency to stain. The molding compounds prepared with a sclerenchyma (fiber) filler displayed the least degree of stain, and those with the highest usage of resin, namely, 35%, stained less than the others having a smaller amount of resin. The molding compounds containing either parenchyma or cork show very severe staining properties, irrespective of the moisture content. In summary, other factors remaining constant, the fiber stains the least and the powder the most with the cork staining an intermediate amount.

High moisture content of a molding compound is conducive to staining. This is readily apparent from molding compounds made with sclerenchyma tissue and resin. At the lower moisture content the degree of stain represents an empirical numerical value of 3, while at the higher moisture content the numerical value is about 5. Molding compounds consisting essentially of cork and resin at the lower moisture content cause severe stain, while at the higher moisture content there is very severe stain.

TABLE I

*Staining properties of molding compounds containing the cork, fiber and powder components of bark*

| Filler | Resin Usage[1] | Moisture | Stain | Moisture | Stain |
|---|---|---|---|---|---|
| | Percent | Percent | | Percent | |
| Pure Cork | 15 | 3.3 | Severe | 6.1 | very severe. |
| | 22 | 3.3 | ____do____ | 6.0 | Do. |
| | 28 | 3.3 | ____do____ | 5.9 | Do. |
| | 35 | 3.0 | ____do____ | 5.1 | Do. |
| Pure Fiber | 15 | 3.7 | 3 | 8.8 | 5. |
| | 22 | 4.8 | 3 | 8.2 | 5. |
| | 28 | 2.9 | 3 | 8.0 | 5. |
| | 35 | 2.9 | 2 | 7.6 | 3. |
| Powder | 15 | 4.7 | very severe | 10.2 | very severe. |
| | 22 | 4.7 | ____do____ | 9.4 | Do. |
| | 28 | 4.2 | ____do____ | 9.9 | Do. |
| | 35 | 2.9 | ____do____ | 10.1 | Do. |

"Very severe" staining is beyond the empirical numerical system employed.

Formulation:
  Percent 1-step phenol-formaldehyde liquid resin_____ (see above)[1]
  Bark Component_____ (difference)
  Percent calcium stearate_____ 0.5
  Percent MgO_____ 2.0
  Percent dye (Nubian resin black)_____ 1.0
  Percent flow modifier (Velsicol AF-3)_____ 3.0

The evaluation of stain and sticking is expressed numerically in the tables appearing in this application by numbers 1 to 6. A value of 1 for staining or sticking indicates that neither of these phenomena is present, whereas a numerical evaluation of 6 indicates that the condition thus defined is present to a severe extent.

The temperatures at which the compounds are molded influence their staining properties. Molding compounds were molded at different temperatures and for different periods of time in the mold. A summary of these results is presented in Table II. A reduction in temperature from 375° F. to 350° F. does not appreciably lower the degree of stain. A further lowering of the temperature from 350° F. to 340° F. reduces all the stain values to an empirical numerical value of 1. The retention of the molding compound in the press for a longer than usual period of time, in this case 90 minutes at 340° F., shows that an increase in the stain occurred from 1.0 to 3.0 for molding compounds embodying the invention. Staining from this source may be lessened by molding at as low a temperature and for as short a time period as are consistent with the making of a properly cured article.

TABLE II

*The effect of molding temperature on the degree of stain*

Formulation:
  Percent resin (1-step liquid phenyl-formaldehyde) (Ratio formaldehyde/phenol 1.4:1) _____ 28.0
  Percent filler (ground bark fiber) 90% purity_____ 61.5
  Percent Calcium Stearate_____ 0.5
  Percent Dye (Nubian Resin Black)_____ 1.0
  Percent MgO_____ 4.0
  Percent flow modifier (Velsicol AF-3)_____ 5.0

| Temperature of Molding | Stain Evaluation | Press Time |
|---|---|---|
| 375° F | 3.0 | 30 min. |
| 350° F | 2.0 | 30 min. |
| 340° F | 1.0 | 30 min. |
| 340° F | 2.0 | 90 min. |

The incorporation of magnesium oxide into the molding compound reduces staining, a minimum of approximately 2% being required to reduce stain an appreciable degree. Table III shows percentages of catalysts from 0% to 4% and discloses that whereas magnesium oxide alone is useful for reducing stain, a mixture of magnesium oxide and borax is effective to reduce both staining of the mold and adherence thereto of the molded piece (sticking). The effect of the borax in preventing sticking is most striking. It is noted that whereas 4% MgO alone yields a stain value of 2, but a stick value of 6, the same amount of MgO mixed with but 0.75% of borax maintains the satisfactory stain value and also renders the compound non-sticking.

TABLE III

*Numerical evaluations of stain and stick with varying amounts of catalyst (MgO)*

| Percent Catalyst MgO | Stain | Stick | Catalyst plus 0.75% Borax | |
|---|---|---|---|---|
| | | | Stain | Stick |
| 0 | 6.0 | 1.0 | 6.0 | 1.0 |
| 1 | 4.0 | 2.5 | 6.0 | 1.0 |
| 2 | 2.5 | 5.0 | 5.0 | 1.0 |
| 3 | 2.0 | 6.0 | 3.0 | 1.0 |
| 4 | 2.0 | 6.0 | 2.0 | 1.0 |

Magnesium oxide in usages of 1–5% serves the dual purposes of resin catalyst and stain inhibitor. Not only does magnesium oxide effect the fastest curing rates of the alkaline earth oxides, but it also inhibits mold staining, even in the presence of as much as 8% moisture or 20% of cork fraction in the compound. The permissible pH range when magnesium oxide is used is 7.5 to 9.0. Applicant has found that staining severity decreases as the pH value of the compound is increased. However, the permissible pH range is lower for magnesium oxide than for the alkaline earth oxides conventionally employed as resin catalysts. Calcium oxide, and to a lesser degree slacked lime, will reduce or prevent staining in proportion to their usage.

As a general rule, as the ratio of resin to filler decreases the stain increases. Above the range of about 25–30% resin a molding compound shows less tendency to stain than a similar compound with a resin content of less than 25–30%. In Table IV there is listed the test results for resin usages of 35%, 28%, and 22%; four variations of lime with each resin usage of 3%, 2%, 1% and 0%. At a lime content of 3% the stain increased from empirical numerical values of 2 to 3 as the resin usage decreased; at 2% lime the degree of stain increased from 3 at resin usages of 35% and 28% to 4 at 22% resin; at 1% lime the degree of stain increased from 3 at 35% resin to 4 at resin contents of 28% and 22%, indicating that in the range of 25–30% resin an increase of lime or alkaline material will decrease the stain; and, at 0% lime there is a considerable increase in the degree of stain, 3 to 6, upon decreasing the resin from 35% to 28%.

The sticking of a molding compound to the mold may be described as resulting from the wetting of the mold by soluble or otherwise mobile components followed by the baking on of this material. It is probable that stain and sticking represent varying degrees of the same phenomenon. Low resin-content, bark-filled molding compounds as exemplified in the instant invention have greater tendency to stick and stain the mold than do compounds containing higher percentages of resin. Acidity of filler and insufficiently advanced resin are known to contribute to sticking.

Sticking of the molded piece to the mold may be avoided through (1) special processing of the compound, and (2) by the use of suitable additives to the formulation.

Although the mechanism is not understood, it has been found that incorporation of from 0.5% to 1.0% of borax in a compound containing such alkaline catalysts as lime or magnesium oxide reduces the tendency of that compound to stick to the mold during the molding process. Borax [$Na_2B_4O_7 \cdot 10H_2O$] is a remarkably stable inorganic salt having unique characteristics. It has a sharp melting point of 75° C. and a boiling point of 200° C., at which temperature the hydrate begins to lose its water of crystallization. Therefore, the borax added to the molding compound formulation is in a molten state at the temperatures maintained during the molding process and, being soapy, probably affects the interfacial tension relationships between the molding compound and the surfaces of the mold to minimize the wetting of the mold surfaces by the molten compound.

TABLE IV
*Molding compounds with variable resin, lime, and fiber*

| Formulation: | | | | | | | | | | | | |
|---|---|---|---|---|---|---|---|---|---|---|---|---|
| Percent two-step solid Phenol-Formaldehyde resin | 35 | 35 | 35 | 35 | 28 | 28 | 28 | 28 | 22 | 22 | 22 | 22 |
| Percent Lime | 3 | 2 | 1 | 0 | 3 | 2 | 1 | 0 | 3 | 2 | 1 | 0 |
| Percent Pure Fiber | 61.5 | 62.5 | 63.5 | 64.5 | 68.5 | 69.5 | 70.5 | 71.5 | 74.5 | 75.5 | 76.5 | 77.5 |
| Percent Calcium Stearate | 0.5 | 0.5 | 0.5 | 0.5 | 0.5 | 0.5 | 0.5 | 0.5 | 0.5 | 0.5 | 0.5 | 0.5 |
| Tests on Compound: | | | | | | | | | | | | |
| Flow (sec.) Cup Closing Time (2,000 p. s. i.) | 15 | 12 | 14 | 14 | 18 | 17 | 18 | 18 | 30 | 27 | 20 | 21 |
| Cure (min.) | 1.5 | <3 | <3 | <3 | <3 | <3 | <3 | <3 | <3 | <3 | <3 | <3 |
| Ratio {Resin/Fiber} | 0.57 | 0.56 | 0.55 | 0.54 | 0.41 | 0.40 | 0.40 | 0.39 | 0.29 | 0.29 | 0.29 | 0.28 |
| Stain (375° F.) | 2 | 3 | 3 | 3 | 3 | 3 | 4 | 6 | 3 | 4 | 4 | 6 |
| Tests on Plastic: | | | | | | | | | | | | |
| Rupture Modulus, p. s. i. | 11,300 | 10,500 | 10,600 | 10,800 | 9,900 | 10,400 | 9,200 | 9,600 | 9,400 | 10,000 | 10,300 | 9,300 |
| Tensile, p. s. i. | 6,700 | 6,900 | 6,900 | 6,300 | 5,600 | 7,300 | 7,300 | 7,600 | 7,400 | 7,400 | 5,800 | 7,600 |
| Impact-Notched Izod (ft. lb./in.) | 0.32 | 0.34 | 0.43 | 0.38 | 0.40 | 0.42 | 0.42 | 0.35 | 0.32 | 0.56 | 0.34 | 0.36 |

Incorporation of these additives in the quantities required for effective elimination of stick and stain does not deleteriously affect the flow or cure properties of the molding compound, or the strength or appearance of the molded piece.

The degrees of sticking in test results are determined by cleaning two steel plates and preheating these plates in a press for approximately five minutes until the desired temperature is reached. This desired temperature is usually about 320° F. The plates are removed from the press and approximately 3 grams of the molding compound placed therebetween. This sandwich is reinserted into the press and subjected to a pressure of approximately 1,000 pounds per square inch at the test temperature and for about two minutes. The plates are removed and separated and the tenacity with which the molded disc adheres to the plates is observed. The degree of sticking is judged subjectively and given an empirical numerical rating wherein a numerical value of 1 indicates that no sticking is produced, whereas a numerical value of 6 indicates severe sticking. An average of five test values is reported.

This application is a continuation-in-part of application, Serial No. 239,407, filed July 30, 1951, by Clark C. Heritage, for Thermosetting Molding Compounds, now abandoned, said application being a continuation-in-part of application Serial No. 534,981, filed May 10, 1944, by Clark C. Heritage, for Molding Compounds, now abandoned.

Having now described my invention and in what manner the same may be used, what I claim as new and desire to protect by Letters Patent is:

1. A thermosetting molding composition consisting of the thermal reaction product of a mixture of a finely comminuted tissue component derived from the bark of a coniferous tree consisting almost entirely of its bast fiber and a thermosetting moldable phenol-formaldehyde resin in which the molar ratio of formaldehyde to phenol is greater than 1.4:1, said bark components comprising phenolic compounds reactive with the methylol groups of the resin, said ratio of formaldehyde to phenol increasing as the proportion of bark material to said resin increases, and a mixture of from 0.5% to 1.0% of borax and from 1.0% to 5.0% of an alkaline earth metal oxide, the percentages being on the basis of the molding composition.

2. A thermosetting molding composition having the formulation described in claim 1 wherein the alkaline earth metal oxide is magnesium oxide.

3. A thermosetting molding composition having the formulation described in claim 1 wherein the alkaline earth metal oxide is calcium oxide.

4. A thermosetting molding composition having the formulation described in claim 1 wherein the thermosetting resin is a one-step phenol-formaldehyde liquid resin having a resin solids content of from 15% to 40% by weight of the molding composition.

5. A thermosetting molding composition having the formulation described in claim 1 wherein the bast fiber of the bark consists of from 55% to 80% by weight of the molding composition and the resin solids content of the phenol-formaldehyde resin consists of from 15% to 40% by weight of the molding composition.

References Cited in the file of this patent

UNITED STATES PATENTS

| Number | Name | Date |
|---|---|---|
| 1,580,425 | Ellis | Apr. 13, 1926 |
| 2,326,569 | Rosenthal | Aug. 10, 1943 |
| 2,424,787 | Adams | July 29, 1947 |
| 2,606,888 | Williams | Aug. 12, 1952 |

FOREIGN PATENTS

| Number | Country | Date |
|---|---|---|
| 440,294 | Italy | Oct. 9, 1948 |

OTHER REFERENCES

Porter: Chemical Engineering, July 1947, pages 159, 160 and 162.

Marple: Plastics (Chicago), pages 44, 65, 66 and 67, August 1947.

Robitschek: Phenolic Resin, pp. 76, 77, 79, 81, Iliffe and Sons, London, England. Copy received in Patent Office March 12, 1950.